United States Patent
Kaarela et al.

(10) Patent No.: US 9,011,254 B2
(45) Date of Patent: *Apr. 21, 2015

(54) GAMING VIA PEER-TO-PEER NETWORKS

(71) Applicant: Core Wireless Licensing S.a.r.l., Luxembourg (LU)

(72) Inventors: Kari Kaarela, Oulu (FI); Timo Tervo, Oulu (FI); Kirmo Koistinen, Oulu (FI); Mikko Hyvarinen, Oulu (FI); Jukka Parkkinen, Oulu (FI)

(73) Assignee: Core Wireless Licensing S.a.r.l, Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 14/088,335

(22) Filed: Nov. 22, 2013

(65) Prior Publication Data

US 2014/0080591 A1   Mar. 20, 2014

Related U.S. Application Data

(63) Continuation of application No. 11/593,873, filed on Nov. 7, 2006, now Pat. No. 8,616,976.

(51) Int. Cl.
*A63F 9/24* (2006.01)
*A63F 13/00* (2014.01)
(Continued)

(52) U.S. Cl.
CPC ............... *A63F 13/12* (2013.01); *G07F 17/32* (2013.01); *G07F 17/3223* (2013.01); *G07F 17/323* (2013.01)

(58) Field of Classification Search
USPC .......................................................... 463/42
See application file for complete search history.

(56) References Cited

U.S. PATENT DOCUMENTS 6,524,189 B1   2/2003   Rautila
6,604,140 B1   8/2003   Beck et al.
(Continued)

FOREIGN PATENT DOCUMENTS

EP   1617333   1/2006
EP   1705576   9/2006
(Continued)

OTHER PUBLICATIONS

Bouras et al., "'Input here—Execute there' through networks: the case of gaming," The 15th Workshop on Local and Metropolitan Area Networks (LANMAN 2007), Princeton, NJ, USA, Jun. 10-13, 2007, made available by download form "Research Unit 6" website on Oct. 15, 2012, 2 pages.

(Continued)

*Primary Examiner* — Kevin Y Kim
(74) *Attorney, Agent, or Firm* — Ziegler IP Law Group, LLC

(57) ABSTRACT

A method includes discovering, via a device, a peer-to-peer gaming service of a peer-to-peer network offered by a peer device, wherein the peer-to-peer gaming service facilitates a user of the device to select, access, and play a plurality of specific networked games of the peer device, wherein the specific networked games are not already installed on the device, selecting, via the device, a networked game from the plurality of specific networked games of the peer device, and downloading a program by the device, wherein the program is configured to execute the selected networked game on a processor of the device, wherein downloading the program comprises downloading the program from a third party computing arrangement and receiving from the peer device, authentication for access to the third party computing arrangement, wherein the authentication limits the downloaded program for play of the networked game with only the peer device.

33 Claims, 7 Drawing Sheets

(51) Int. Cl.
*G06F 17/00* (2006.01)
*G06F 19/00* (2011.01)
*A63F 13/30* (2014.01)
*G07F 17/32* (2006.01)

(56) References Cited

U.S. PATENT DOCUMENTS

| | | |
|---|---|---|
| 6,909,721 B2 | 6/2005 | Ekberg et al. |
| 7,206,841 B2 | 4/2007 | Traversat et al. |
| 7,487,230 B2 | 2/2009 | Gu et al. |
| 7,734,717 B2 | 6/2010 | Saarimaki et al. |
| 2002/0002605 A1 | 1/2002 | Honda |
| 2002/0147771 A1 | 10/2002 | Traversat et al. |
| 2003/0100372 A1 | 5/2003 | Gatto et al. |
| 2003/0208595 A1 | 11/2003 | Gouge et al. |
| 2004/0002385 A1 | 1/2004 | Nguyen |
| 2004/0063498 A1 | 4/2004 | Oakes et al. |
| 2004/0083471 A1 | 4/2004 | Nam et al. |
| 2004/0085947 A1 | 5/2004 | Ekberg et al. |
| 2004/0127277 A1 | 7/2004 | Walker et al. |
| 2005/0240665 A1 | 10/2005 | Gu et al. |
| 2005/0267935 A1 | 12/2005 | Gandhi et al. |
| 2005/0282637 A1 | 12/2005 | Gatto et al. |
| 2006/0026304 A1 | 2/2006 | Price |
| 2006/0031828 A1 | 2/2006 | Won et al. |
| 2006/0067489 A1 | 3/2006 | Morioka |
| 2006/0164550 A1 | 7/2006 | Yoshimoto et al. |
| 2006/0178216 A1 | 8/2006 | Shea et al. |
| 2006/0179079 A1 | 8/2006 | Kolehmainen |
| 2006/0183550 A1 | 8/2006 | Gagner et al. |
| 2006/0200570 A1 | 9/2006 | Stirbu et al. |
| 2006/0217112 A1 | 9/2006 | Mo |
| 2006/0230428 A1 | 10/2006 | Craig et al. |
| 2006/0258341 A1 | 11/2006 | Miller et al. |
| 2006/0282514 A1 | 12/2006 | Saint-Hilaire et al. |
| 2006/0291412 A1 | 12/2006 | Naqvi et al. |
| 2007/0060361 A1 | 3/2007 | Nguyen et al. |
| 2007/0127394 A1 | 6/2007 | Stirbu et al. |
| 2007/0153740 A1 | 7/2007 | Chang et al. |
| 2007/0157148 A1 | 7/2007 | Chang et al. |
| 2007/0162165 A1 | 7/2007 | Stirbu et al. |
| 2007/0195760 A1 | 8/2007 | Rahman et al. |
| 2007/0255798 A1 | 11/2007 | Schneider |
| 2008/0081558 A1 | 4/2008 | Dunko et al. |
| 2008/0108437 A1 | 5/2008 | Kaarela et al. |
| 2008/0130639 A1 | 6/2008 | Costa-Requena et al. |
| 2008/0141347 A1 | 6/2008 | Kostiainen et al. |
| 2008/0201723 A1 | 8/2008 | Bottaro et al. |
| 2009/0161579 A1 | 6/2009 | Saaranen et al. |

FOREIGN PATENT DOCUMENTS

| | | |
|---|---|---|
| GB | 2410150 | 7/2005 |
| WO | 2004040918 | 5/2004 |

OTHER PUBLICATIONS

Jun, "Home Media Center and Media Clients for Multi-room Audio and Video Applications," Consumer Communications and Networking Conference, 2005. CCNC. 2005 Second IEEE, pp. 257-260, Date of Conference: Jan. 3-6, 2005, Date of Current Version: Dec. 12, 2011 (indicated as such by IEEE Xplore on Oct. 15, 2012), 4 pages.

Lee et al., "The u-MUSE System: An Integrated UPnP AV Home Entertainment System supporting RUI Service and Device Mobility," Hybrid Information Technology, 2006. ICHIT '06. International Conference on, Date of Conference: Nov. 9-11, 2006, Cheju Island, Date of Current Version: Apr. 18, 2005 (indicated as such by IEEE Xplore on Oct. 15, 2012), 6 pages.

GAMING VIA PEER-TO-PEER NETWORKS

CROSS REFERENCE TO RELATED APPLICATIONS

This application is a continuation of U.S. application Ser. No. 11/593,873 filed 7 Nov. 2006, which is incorporated herein in its entirety.

FIELD

The disclosed embodiments relate in general to computing devices, and more particularly to providing gaming services via ad hoc, peer-to-peer networks.

BACKGROUND

Universal Plug and Play™ (UPnP) defines an architecture for pervasive, peer-to-peer networking between all types of consumer electronics, including intelligent appliances, wireless devices, and PCs of all form factors. UPnP technologies provide a way for disparate processing devices, to exchange data via proximity or ad hoc networks. The UPnP framework is designed to bring easy-to-use, flexible, standards-based connectivity to ad hoc or unmanaged networks whether in the home, in a small business, public spaces, or attached to the Internet. UPnP technologies provide a distributed, open networking architecture that leverages TCP/IP and the Web technologies to enable seamless proximity networking in addition to control and data transfer among networked devices.

The UPnP Device Architecture (UDA) is designed to support zero-configuration, "invisible" networking, and automatic discovery for a breadth of device categories from a wide range of vendors. This means a device can dynamically join a network, obtain an IP address, convey its capabilities, and learn about the presence and capabilities of other devices. The UPnP specification includes standards for service discovery. Various contributors publish UPnP device and service descriptions, thus creating a way to easily connect devices and simplifying the implementation of networks. It is the goal of UPnP to enable home electronics to seamlessly interact, thus furthering the usefulness of such devices.

The UPnP standard includes standards for service discovery, and is mainly targeted for proximity or ad hoc networks. Various contributors publish UPnP device and service descriptions, thus creating a way to easily connect devices and simplifying the implementation of networks. UPnP is designed to work in many environments, including the home, businesses, public spaces, and on devices attached to the Internet. The UPnP standard is an open architecture that leverages Web technologies and is designed to provide ad-hoc networking and distributed computing.

UPnP and related protocols were developed primarily to allow consumers to easily assemble a home network, and to access and control devices not normally associated with networked computing. However, the flexible nature of UPnP means that it can be implemented anywhere, and can be adapted to uses not foreseen by the originators of the network framework. For example, UPnP can be used on mobile devices that normally connect to wireless provider networks. Such devices may include secondary wired or wireless interfaces that allow the devices to communicate with other entities of home or business networks.

By their nature, mobile devices are easily transported, thus users tend to have greater access to these devices than other types of computing equipment. As the data processing capabilities and multimedia features of such devices increase, mobile devices may also be used for more advanced leisure activities, such as listening to music, watching movies, playing games, and the like. Such capabilities and activities can often be enhanced by network communications, which allow people to interact with others in shared activities. However, setup and use of network features can be daunting to some users. This perceived difficulty in using network features may prevent some from using networked entertainment functions because they may not feel the effort involved in learning how to use the network features is worthwhile to enhance discretionary activities. Therefore, providing a simple configuration and use of network technologies in support of entertainment activities is desirable.

SUMMARY

To overcome limitations in the prior art described above, and to overcome other limitations that will become apparent upon reading and understanding the present specification, the embodiments disclosed herein are directed to a system, apparatus and method for selection of media via locally coupled personal processing devices. In one embodiment, a method involves configuring a device to offer a generic peer-to-peer gaming service that facilitates access to a plurality of specific networked games of the device. The generic peer-to-peer gaming service is advertised via the device using a service discovery protocol of an ad hoc peer-to-peer network. A networked game is selected from the plurality of specific networked games, and play of the networked game is facilitated via the generic peer-to-peer gaming service. Play of the networked game occurs at least between the device and a peer device of the network.

In at least one embodiment, the method involves a download of a program to at least one of the device and the peer device in response to a selection of the networked game, such program being configured to execute the game on a processor of the respective device. In some configurations, facilitating download of the program to at least one of the device and the peer device involves downloading the program from the other of the device and the peer device and/or from a third party computing arrangement. In other arrangements, game play data of the networked game is exchanged via an out-of-band network mechanism and/or via control protocols of the ad-hoc peer-to-peer network.

In one or more embodiments, the ad-hoc, peer-to-peer network may include a Universal Plug and Play network, and the device and the peer device both may include mobile devices. In one arrangement, facilitating play of the networked game involves providing, via the ad hoc peer-to-peer network, a description of the plurality of specific networked games to the peer device from the device and determining, via the peer device, a set of the specific networked games that are supported at the peer device. In such an arrangement, the network game is selected from the set of supported specific networked games.

According to at least one embodiment, a method involves coupling a device to an ad hoc peer-to-peer network. A generic peer-to-peer gaming service is discovered, via the device, using a service discovery protocol of the ad hoc peer-to-peer network. The generic peer-to-peer gaming service is offered by a peer device and the generic peer-to-peer gaming service facilitates access to a plurality of specific networked games of the peer device. A networked game is selected, via the device, from the plurality of specific networked games of the peer device. The networked game is played between at least the device and the peer device.

According to one or more embodiments, the method further involves facilitating download of a program to at least one of the device and the peer device in response to selecting the networked game. In such a case, the program is configured to execute the networked game on a processor of the respective device. In various configurations, facilitating download of the program to at least one of the device and the peer device involves downloading the program from the other of the device and the peer device and/or downloading the program from a third party computing arrangement.

In at least one embodiment, an apparatus includes a network interface capable of communicating via an ad hoc peer-to-peer network. A processor is coupled to the network interface and a memory is coupled to the processor. The memory includes a gaming client module having instructions that cause the processor to: discover a generic peer-to-peer gaming service using a service discovery protocol of the ad hoc peer-to-peer network; select a networked game from the plurality of specific networked games of a peer device; and play the networked game between at least the apparatus and the peer device. The generic peer-to-peer gaming service is offered by the peer device and the generic peer-to-peer gaming service facilitates access to a plurality of specific networked games of the peer device.

In one or more embodiments, the memory further includes a local plurality of specific networked games and a gaming server module. The gaming server module has instructions that cause the processor to: offer a locally provided generic peer-to-peer gaming service that facilitates access to the local plurality of specific networked games, advertise, via the service discovery protocol, the locally provided generic peer-to-peer gaming service; and facilitate play of a second networked game via the generic peer-to-peer gaming service. The second networked game is selected from the plurality of local specific networked games by a second peer device of the network. Play of the second networked game occurs at least between the apparatus and the second peer device. The second networked game may utilize an out-of-band network mechanism and/or control protocols of the ad-hoc peer-to-peer network to exchange gaming event data between the apparatus and the second peer device. The gaming server module may facilitate downloading of a program to the second peer device in response to selecting the networked game by the second peer device, such program facilitating play of the second networked game on the second peer device. The program may be uploaded from the apparatus to the second peer device. In one arrangement, the gaming server module includes a UPnP device.

According to at least one embodiment, the apparatus further includes a user input interface, and the memory further includes a control point module. The control point module has instructions that cause the processor to: receive a list of the specific networked games of the peer device from the client module; facilitate user selection of the selected networked game via the user input interface; and cause the client module to facilitate play of the selected networked game in response to the user selection. The control point module may include a UPnP device.

According to one or more embodiments, the networked game may utilize an out-of-band network mechanism and/or control protocols of the ad-hoc peer-to-peer network to exchange gaming event data between the apparatus and the peer device. The gaming client module may include a UPnP device.

In at least one embodiment, a tangible computer-readable medium has instructions that are executable by an apparatus capable of being coupled to an ad hoc peer-to-peer network. The instructions are executable to perform operations that include: discovering a generic peer-to-peer gaming service using a service discovery protocol of the ad hoc peer-to-peer network; selecting a networked game from a plurality of specific networked games of a peer device; and playing the networked game between at least the apparatus and the peer device. The generic peer-to-peer gaming service is offered by the peer device and the generic peer-to-peer gaming service facilitates access to the plurality of specific networked games of the peer device.

In one or more embodiments, the instructions are executable to perform operations that include: offering a locally provided generic peer-to-peer gaming service that facilitates access to a local plurality of specific networked games; advertising, via the service discovery protocol, the locally provided generic peer-to-peer gaming service; and facilitating play of a second networked game via the generic peer-to-peer gaming service. The second networked game is selected from the plurality of local specific networked games by a second peer device of the network. Play of the second networked game occurs at least between the apparatus and the second peer device.

According to at least one embodiment, a system includes means for offering, via a first peer device, a generic peer-to-peer gaming service via a service discovery protocol of an ad hoc peer-to-peer network. The generic peer-to-peer gaming service facilitates access to a plurality of specific networked games. The system also includes means for discovering, via a second peer device of the network, the generic peer-to-peer gaming service, and means for facilitating commencement of a selected specific networked game between the first and second peer via the generic peer-to-peer gaming service.

These and other aspects of the disclosed embodiments are included in the claims annexed hereto and form a part hereof. Reference may also be made to the drawings which form a further part hereof, and to the accompanying descriptive matter, in which there are illustrated and described representative examples of systems, apparatuses, and methods in accordance with the disclosed embodiments.

BRIEF DESCRIPTION OF THE DRAWINGS

Non-limiting aspects of the disclosed embodiments are illustrated in the following diagrams.

DETAILED DESCRIPTION

Figure 1:
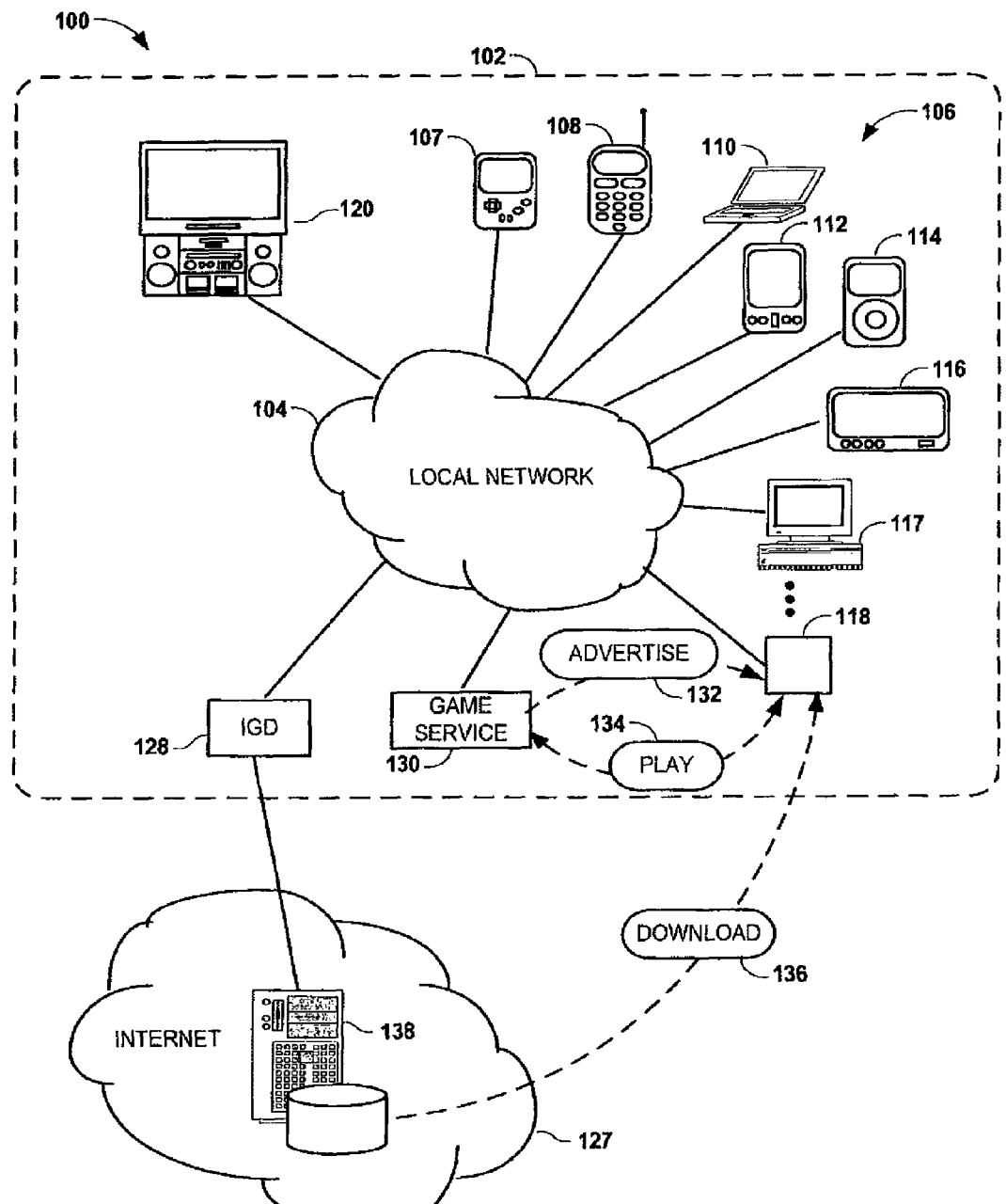
FIG. 1 is a block diagram illustrating a system according to the disclosed embodiments.

In the following description of various exemplary embodiments, reference is made to the accompanying drawings that form a part hereof, and in which is shown by way of illustration various aspects by which the disclosed embodiments may be practiced. It is to be understood that other aspects may be utilized, as structural and operational changes may be made without departing from the scope of the presently disclosed embodiments.

Generally, the disclosed embodiments relate to methods, systems, and apparatus that enable games to be discovered and utilized via ad hoc, peer-to-peer networks. Generally, these games include networked games that utilize some aspect of network connectivity during game play. This may involve allowing multiple players to join in the same game via the network. In other arrangements, some devices may be involved in the gaming activity without the device user actually playing. For example, the device may provide data used in the game play, such as in generating questions in a trivia game. In another example, the device may provide simulated players (e.g., "bots") to fill in for games that may require a minimum number of players.

Many computer games are capable of operating via networks, including card games, board games, role playing games, action games, etc. These games are typically configured so that one machine acts as a server and listens for other players with the same game who try to connect with the server. Other parties having the same game in their device may manually find the server (e.g., by typing in the hostname or IP address), use some sort of proprietary network discovery mechanism, and/or receive an invitation to join the game by the server operator or another player.

Commercially available networked games are typically "hard-coded" and "special purpose" in the sense that they are game-specific. For example, each game includes proprietary mechanisms for discovering the game's server, allowing access to the server, and interacting during game play. These games typically require that all devices used by the players have compatible software running locally on the respective device. As some games only run on a limited number of platforms (e.g., processor type, operating system, etc.), the ability to join may be limited to only those players having compatible devices.

In a system according to an at least one aspect of the disclosed embodiments, a generic network gaming interface allows any network game to be discovered and utilized via a single generic interface. Therefore, in such an arrangement, a user could be made aware of a multitude of games available for immediate play, even if that user does not have the specific game installed on their device. In some scenarios, the network may allow the user to download an executable image to play the game, either from another player already on the network, or from some other source. The network data needed to engage in game play may also be handled by the peer-to-peer network protocols, or may utilize mechanisms outside of those protocols, sometimes referred to as "out-of-band" communications. In one arrangement, the network may be a UPnP network. In the context of protocols such as UPnP the term "out-of-band" generally refers to communications that occur outside of the UPnP stack, but may still utilize some of the lower level network protocols and media that UPnP uses (e.g., TCP, UDP, IP, Ethernet, etc.).

The UPnP framework includes two layers: a general-purpose UPnP device architecture (UDA) and device-specific device control protocols (DCP). There are currently about ten standardized DCPs for various device categories. Game discovery and initiation via UPnP may involve creating a generic framework that enables users to search any available networked games, such that the search would not be tied to a game-specific protocol. A gaming DCP is created that would define the services, actions and state variables that a "UPnP gaming device" would expose to the UPnP network.

In reference now to FIG. 1, a block diagram 100 illustrates an example system according to the disclosed embodiments. Generally, technologies such as UPnP are designed for operating within a limited space. In FIG. 1, a physical boundary defines a local space 102. The dimensions of the local space 102 are generally confined by the underlying network protocols and media, as well as the scalability of the ad-hoc, peer-to-peer networking technologies used to facilitate game play. However, it will be appreciated that other ad-hoc, peer-to-peer protocols may not be limited to any physical space limitations, and so the illustration of the local space 102 is for purposes of illustration, and not of limitation.

The space 102 may include at least one network 104 that is capable of supporting communications with one or more user devices 106. The local network 104 may include any combination of data transmission media and protocols. For example, the network may utilize wired or wireless data transmission media. Similarly, devices 106 on the local network 104 may include various physical and data link layer protocols to intercommunicate, including, Ethernet, FDDI, PPP, ATM, HDLC, Fibre Channel, X-10, serial/parallel point-to-point connections, etc. A number of higher layer network protocols may operate on the network 104 as well, including TCP/IP, UDP/IP, IPX, Appletalk, ICMP, ARP, SNMP, DNS, FTP, NetBEUI, etc.

The user devices 106 include some manner of data processing capabilities, and may be capable of facilitating some manner of game play. In the illustrated diagram 100, the local network devices 106 include a gaming console 107, mobile phone 108, laptop computer 110, personal digital assistant 112, portable music player 114, tablet computer 116, personal computer 117, or any other device as represented by generic data processing device 118. Because protocols such as UPnP are applicable to a wide variety of consumer electronics, other consumer electronics devices may be included in the network, as represented by entertainment center 120. In some arrangements, the consumer electronics device 120 may handle a limited part of the gaming experience, such as rendering sound or video. For example, such capabilities may be included in a read-only memory (ROM) program of the device 120, and thus are relatively fixed for the life of the device 120. In other arrangements, however, the device 120 may include general-purpose computer capabilities such as access to random access memory (RAM), persistent storage, ability to add software programs, etc. In this latter arrangement, the device 120 may be adaptable to provide some or all of the gaming services described herein.

Preferably, the network 104 and its underlying protocols are designed to be generic and flexible so that many types of control or data processing functionality can be abstracted and offered as a service to other entities on the network 104. In one embodiment, the local network 104 may support one or more protocols for ad-hoc, peer-to-peer service discovery and interoperability. Examples of ad-hoc, peer-to-peer protocols are those protocols used in the UPnP architecture. UPnP uses the Simple Service Discovery Protocol (SSDP) for service discovery, and is generally built on top of Internet Protocol (IP) based networks. Although concepts of the disclosed embodiments may be described in terms of UPnP networks, those familiar with the applicable art will appreciate that these concepts may be applied to any manner of ad-hoc, peer-to-peer networking arrangement suitable for consumer or business networks. For example, the Service Location Protocol (SLP), Zeroconf, and Jini™ are protocols that provide functions similar to those of UPnP.

The local network 104 may be designed to service a limited physical region, as indicated by the boundary 102. The protocols used in such a local network 104 (e.g., UPnP) often assume that the network 104 will need to support only a limited number of devices operating within a reasonably small area. However, many devices on the local network 104 may benefit from information services available via an external network, for example the Internet 127. The UPnP specification defines a special service/function known as an Internet Gateway Device (IDG) 128. The IDG function 128 can be provided by one of the devices 106, 120 and may provide routing and firewall services on behalf of the other devices 106, 120 of the local UPnP network 104. It will be appreciated that a dedicated gateway device may perform IDG functions 128 on the UPnP network 104, as well as providing traditional gateway/router functions for non-UPnP devices.

In at least one embodiment, two or more of the user devices 106 have a specialized component that enables the devices 106 to share and/or discover games 130 that are advertised as generic network services. The game service 130 may be hosted by one or more of the network devices 106 and is advertised 132 according to service discovery protocols of the local peer-to-peer network 104. For example, devices on a UPnP network advertise via SSDP, which uses XML UDP unicast and multicast packets to advertise 132 services. In response to the advertisement 132, a device 118 may initiate further negotiations to discover particulars about the service 130. Assuming the device 118 is willing and able to utilize the service 132, game play 134 can commence, either via the service protocols (as shown) or via out of band communications.

In some cases, the service 130 may be able to upload the necessary software instructions to the responding device 118, or direct the device 118 to a third party for download 136, such as the illustrated Internet server 138. Although some games may be platform specific, many devices commonly include runtime environments such as Java™ or Microsoft™ .NET that allow platform-independent code to be distributed and run on differing platforms. Each platform includes a run-time environment (e.g., Java JRE) compiled for the specific platform, and any programs for that run-time environment can be compiled once and run on any platform that includes the appropriate run-time environment. Games may also utilize platform independent standards for initiating game play 134, such as HTTP/HTML used on the World Wide Web. Typically, any given platform has numerous programs that can take advantage of these standardized protocols, and thus can engage in game play 134 without having game-specific software installed.

It will be appreciated that the illustrated system 100 holds many advantages over traditional ways of networking games. In proprietary systems, the user must first have knowledge of the gaming activity, install the gaming software, and then attempt to find a community in which to engage in the activity. However, in a system according to the disclosed embodiments, the existence of the gaming activity and the existence of others who are willing to engage in the gaming activity are readily available by just performing service discovery via the ad hoc networks. In many situations, the users may be able to engage in the gaming activity without any additional software, such as where games utilize commonly available software tools (e.g., browsers, email clients, Java run-time environments, etc.). In other case, the software could be automatically downloaded on a trial or permanent basis. This allows users to be more discerning about which gaming activities they wish to install on their system based on the actual usage of such activities in environments frequented by the user.

Figure 2:
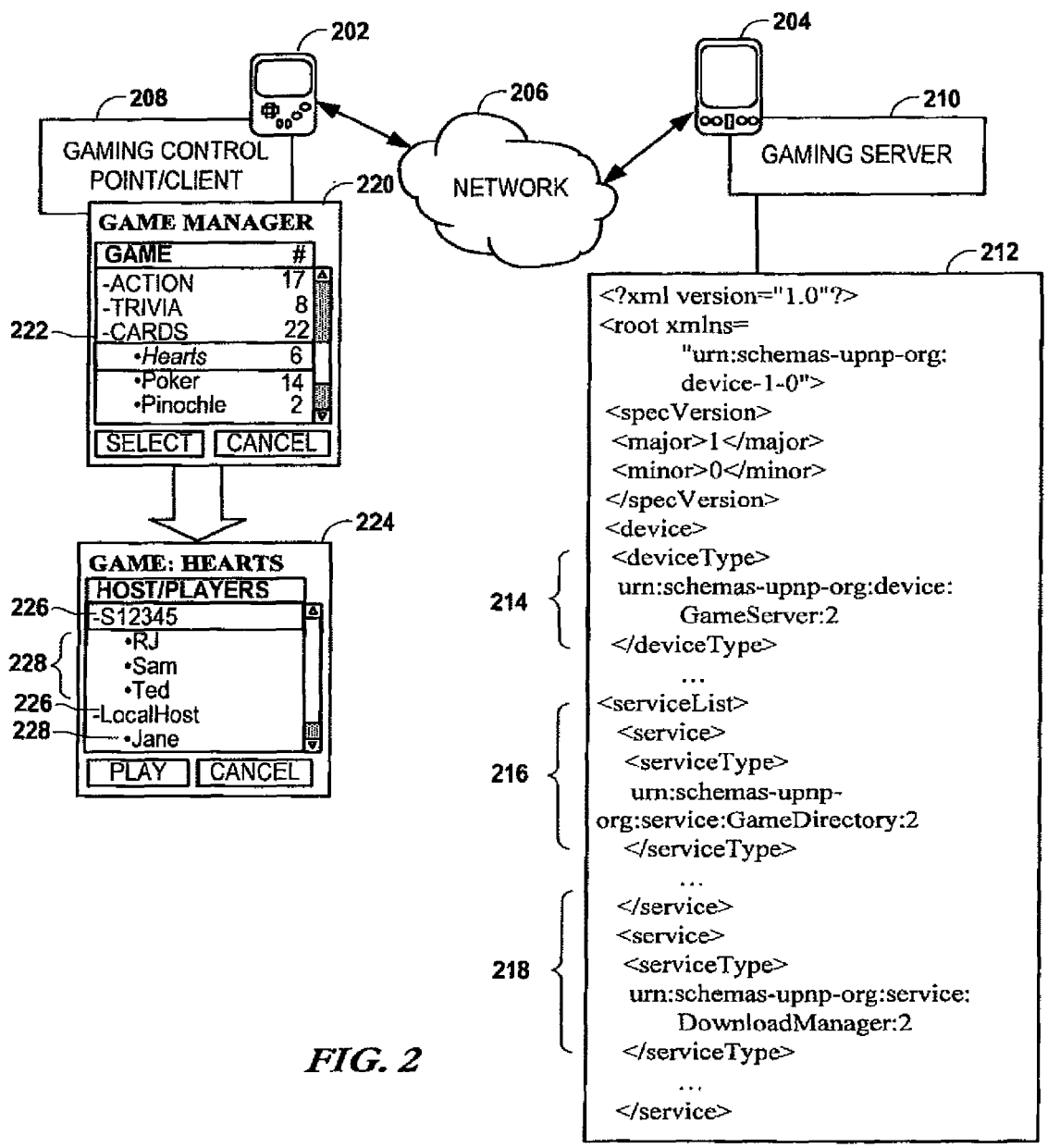
FIG. 2 is a block diagram illustrating an implementation of a gaming service according to the disclosed embodiments.

In reference now to FIG. 2, a more detailed example is presented of how network gaming can be facilitated in accordance with the disclosed embodiments. Two mobile devices 202, 204 are coupled via an ad hoc, peer-to-peer network 206. In this example, mobile device 202 includes a gaming control point/client 208 and device 204 includes a gaming server 210. It will be appreciated that both devices 202, 204 may include any combination of respective control point/client 208 and server components 210, although in this example only the illustrated components 208; 210 are being utilized on respective devices 202, 204. In this scenario, the device 204 may be acting as a UPnP device that is offering its services 210 to other UPnP devices on the network 206. As such, the device 204 may provide an eXtensible Markup Language (XML) device description 212 in response to queries received via the network 206.

The example device description 212 includes variables that describe the device itself, such as the device type 214. Generally, a UPnP device also provides one or more services, and the illustrated device description 212 shows two example services, a game directory service 216 and a download manager service 216. The game directory service 216 facilitates listing of game play activities that are available by the server device 218. The directory service 216 may be able to provide listing of games using various criteria (e.g., name, identifying numbers/symbols, type, in-progress, etc.) and provide details of specific games that allow game play to be engaged with those games (e.g., executable file name, version, hostname/port, etc.). The download manager service 218 may be configured to facilitate downloads of configurations and executable images, either from the device 204 itself or from a third party. For example, the download manager 218 may provide authentication that allows the other device 202 to access a Web download site and obtain an executable that may be good for limited purposes (e.g., only for playing with device 204) or for unlimited use by the owner of device 202.

The gaming server 210 generally at least allows other network entities such as the control point component 208 to view and select networked games that are available via the device 204. The control point component 208 may also be able to view, query, and use the services offered by this and other game servers 210. In this example, the client device 202 may be owned by a traveler who is enduring a long wait at an airport. He/she takes the mobile device 202 (or any other suitable device) and starts a "game manager" function accessed via the control point 208 and represented in screen 220. The game manager 220 queries the network 206 for available networked game services, such as service 210. At the same time the device 202 may also expose its own networked games to other possible users (e.g., via a server component similar to server 210).

In the background, the control point 208 (or other client component) may automatically activate the network interface(s) (WLAN, BT PAN, etc.), logon to open the network(s), and/or start a search for other gaming devices that advertise using compatible service description protocols. As indicated by list 222, the game manager 220 may indicate the discovered networked games for the user to select and play. This list 222 may be compiled from multiple hosts on the network, including device 204. The results may be shown on the list 222 in different ways. In this example, the list 222 shows games by type and name, and upon selection of a game, a second screen 224 may be shown. This screen 224 shows hosts 226 that are serving this particular game (hearts, in this example), and includes identifiers 228 of other players currently engaged in a networked game session.

Figure 3:
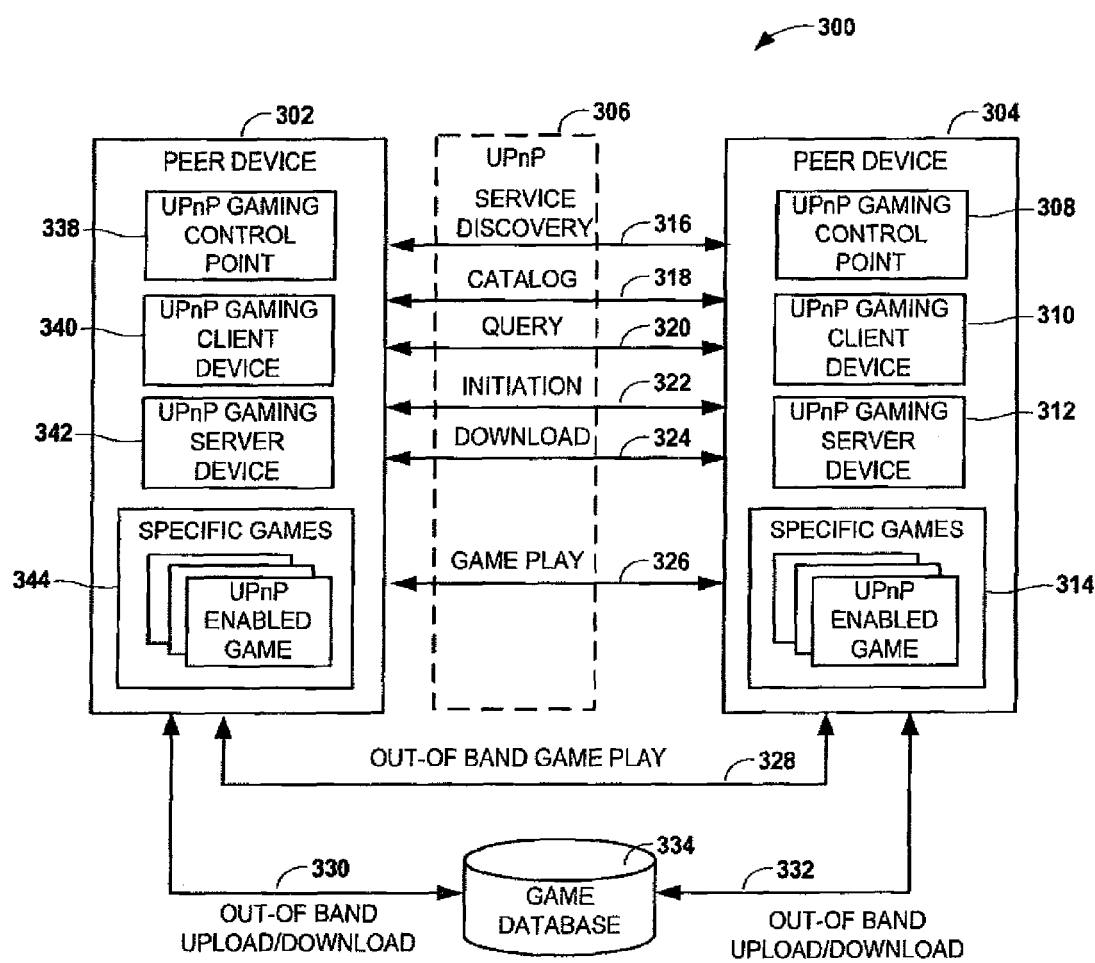
FIG. 3 is a block diagram illustrating a UPnP gaming architecture according to the disclosed embodiments.

The systems described herein may be implemented using any combination of networking technologies known in the art. For example, the UPnP framework may provide gaming activities via network entities. In reference now to FIG. 3, a block diagram 300 illustrates an example implementation of a UPnP gaming architecture according to one or more of the disclosed embodiments. The diagram 300 includes two compatible peer devices 302, 304 that may interact via a UPnP network 306. The devices 302, 304 typically represent separate hardware components, however there may be some arrangements where the devices 302, 304 are virtual devices that share hardware with each other and with other components of the network 306.

As illustrated, the device 302, 304 may include identical functional components 308, 310, 312, 314, 338, 340, 342, 344 that allow each device 302, 304 to host games (e.g., acting as a server) and find/play games (e.g., acting as a client). It will be appreciated that it is not necessary for the devices 302, 304 to each include all of the listed functionality in a usable system. For example, some devices may be configured to act only as a client, either through disabling game server functionality or not having such functionality installed to begin with. Similarly, the functional components may be distributed across multiple physical devices yet operate in an integrated fashion as if on a single device. For example, peer device 302 may be comprised of a handheld controller acting as the UPnP control point 338, and this controller communicates via Bluetooth with a cellular phone in the user's pocket, and the cellular phone acts as a UPnP client 340.

In the description below, functional components 308, 310, 312, 314 of peer device 304 will be described in greater detail. It will be appreciated that the same functionality may also be provided by analogous components 338, 340, 342, 344 of device 302. The illustrated device 304 includes a UPnP gaming control point 308, a UPnP gaming client 310, and a UPnP gaming server 312. Each of the components 308, 310, 312 are configured to communicate via UPnP protocols, and as such will implement the UPnP Device Architecture (UDA). Also associated with these components 310, 312, 314 is a UPnP gaming device control protocol (DCP) that defines the actions and state variables of the various interactions between components 310, 312, 314.

The UPnP gaming control point 308 may provide functions similar to other UPnP control points, such as the UPnP audio video (AV) control point. Generally, the control point 308 includes the user interface and application logic that allow a user to discover UPnP gaming devices and use the services of those gaming devices. The UPnP gaming control point 308 may also provide other control functions for activities associated with finding, selecting, querying, configuring, and playing games. The control point 308 can invoke the UPnP gaming DCP to perform these actions in order to get a desired response.

The gaming client device 310 is a UPnP device that provides UPnP interface for connecting to gaming servers. The client device 310 may operate in response to operations of the control point 308, other user interface devices, or in response to other, non-user initiated events. Generally, the client device 310 interacts with gaming servers 312, 342 to at least initiate game play, and may also handle the data and events that occur during game play.

The UPnP gaming server 312 acts as a central point for accessing specific games 314 that are available on the device 304. More specifically, the server 312 is a UPnP device with the "gaming" service exposing the available games 314. The server device 312 may also handle the actions and maintain the state variables associated with the games 314. The server device 312 may use a registry or some other mechanism for tracking and categorizing various games 314 that are available via the peer device 304. The server device 312 may also control the states and data involved in game play 326, including handling/generating data exchanged between the gaming client device 310 of the local peer device 304 and a remote client 340 of another peer device 302.

The components 308, 310, 312, 314, 338, 340, 342, 344 may interact for such purposes as service discovery 316, cataloging 318, query/search 320, as well as initiation 322 and or download 324 of gaming programs, and game play 326. In some arrangements, the server device 312 may be able to handle game play data 326 for both generic interfaces of the client device 310 and for specific, specialized games 314. In the latter case, the server device 312 may just forward data, although it is possible that the server device 312 may be able to track states, buffer remote data, handle network disconnect/reconnect, etc. on behalf of the games 314. For some games 314, the relatively verbose XML messages utilized by UPnP protocols may not be efficient enough to provide adequate performance, and therefore the games may use an out-of-band mechanism 328 for game play. This out-of-band mechanism 328 may include dedicated network connections, alternate network access mechanisms and media, streaming data, multicast data, etc. Similarly, the downloading function 324 may involve downloads either directly between the devices 302, 304 and/or by using the devices 302, 304 as proxies. However, out-of-band upload/download mechanisms 330, 332 may also be used, such as for accessing games from a games database 334 and/or adding games to the database 334.

Generally, the games 314 themselves handle the user inputs and/or outputs needed during game play. The games 314 are generally UPnP aware, at least in being able to communicate with the various UPnP devices 308, 310, 312. In some arrangements, this functionality may be included with the game 314, or be added later by way of a plug-in or other customizable run time module or patch. In other cases, a "wrapper" program may be used to execute some games 314. Such a wrapper program could execute the game 314 in a virtual run-time environment, and translate between proprietary data/events of the game 314 and the data/events needed to communicate via UPnP. In other cases, the UPnP server 312 (or some other UPnP component) may be able to manage the execution of non-UPnP games by operating system calls. For example, many operating systems allow the execution and termination of processes via text command line statements. These command line statements may also be used to configure run-time parameters and redirect input and output data, such that the UPnP server 312 (or other component) handles UPnP states and data on behalf of the game program.

In another arrangement, a UPnP component (e.g., the gaming client 310) may include a generic application program interface (API) for rendering a wide variety of games on its own. For example, the gaming client 310 may include a playing card API that allows add-on modules and/or rule definitions that enable the client 310 to render any type of card game, either via its own user interface, or via another program's interface (e.g., a browser). Such add-ons or rules may also be associated with a standardized network protocol that governs game play. In this way, any compatible gaming client 310 may be able to play a wide variety of card games, even with different, proprietary gaming programs running elsewhere, so long as such other programs utilize the generic network protocol. Preferably, such other proprietary gaming programs also are capable of interacting with UPnP service discovery protocols, either on their own or via the UPnP gaming server 312.

Figure 4:
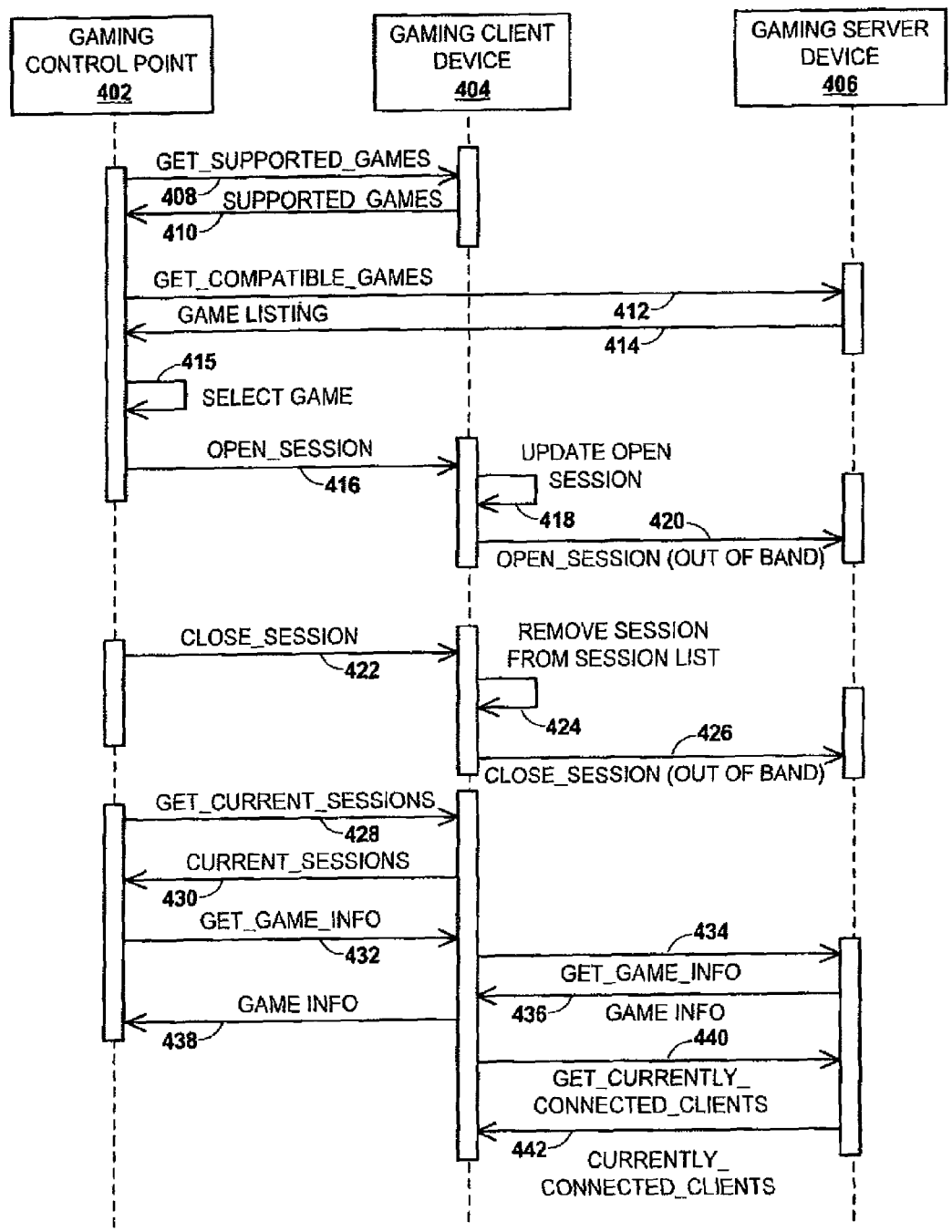
FIG. 4 is a sequence diagram of gaming service interactions according to the disclosed embodiments.

In reference now to FIG. 4, a sequence diagram 400 illustrates opening and closing of gaming sessions according to at least one embodiment. The sequence diagram 400 shows data exchanges between a gaming control point 402, a gaming client device 404 and a gaming server 406. These devices 402, 404, 406, may include the functionality described in relation to UPnP components shown in FIG. 3, although similar components and functionality may be included in non-UPnP implementations. In a UPnP implementation, the events shown in FIG. 4 may be included as part of a UPnP Gaming DCP. The GetSupportedGames action 408 is sent from the control point 402 to the client device 404, which returns a list 410 of the games supported by the client device 404. Based on this list 410, the control point 402 can send a GetCompatibleGames action 412, which returns a processed list 414 games that match both the server 406 and client 404. Generally, the list 410 of the client's games can be used as a parameter in the action call 412.

After a list 414 of compatible games has been determined, the control point 402 can facilitate selection 415 of a specific game. The control point 402. sends an OpenSession message 416 to the gaming client 404. In response, the client 404 updates 418 a list of open sessions, and a gaming session 420 is opened with the gaming server 406. In one arrangement, the session itself uses an out-of-band protocol. For example, the OpenSession message may cause the server 406 to launch a particular executable with command line parameters that describe the network parameters (e.g., IP address and port) of the requesting device, and the executable will automatically commence game play.

At the end of game play, the control point 402 detects the end of game play and sends a CloseSession 422 to the client 404, which closes the gaming session 426 and updates 424 the local list. Alternatively, the client 404 itself may detect the closing of the gaming session and take the appropriate actions 424, 426. Note that the termination 426 of the gaming session may be communicated to the server 406 via out of band mechanisms, although a UPnP message may also be used to ensure any state maintained by the server 406 is updated.

Also shown in FIG. 4 are additional communications that may be initiated at any time before, during, or after game play. The GetCurrentSessions 428 call returns a list 430 of currently open sessions. The GetGameInfo call 432 returns information 438 related to the selected game. As shown, the information 438 may be obtained via a call 434 to the server device 406, which returns information 436 on a selected game. The GetCurrently-ConnectedClients 440 call returns a list 442 of clients that are currently connected to the server 406, such as for a particular game identified by a GameID. If the call 440 is related to one or more selected games, then one or more GameIDs may be included as a parameter in the action call 440.

Many types of apparatuses may be able to engage in games as described herein, for example, mobile devices. In reference now to FIG. 5, an example is illustrated of a representative mobile computing arrangement 500 capable of carrying out operations in accordance with the disclosed embodiments. Those skilled in the art will appreciate that the exemplary mobile computing arrangement 500 is merely representative of general functions that may be associated with such mobile devices, and also that landline computing systems similarly include computing circuitry to perform such operations.

The processing unit 502 controls the basic functions of the arrangement 500. Those functions associated may be included as instructions stored in a program storage/memory 504. In at least one embodiment, the program modules associated with the storage/memory 504 are stored in non-volatile electrically-erasable, programmable read-only memory (EEPROM), flash read-only memory (ROM), hard-drive, etc. so that the information is not lost upon power down of the mobile terminal. The relevant software for carrying out conventional mobile terminal operations and operations in accordance with the present embodiments may also be transmitted to the mobile computing arrangement 500 via data signals, such as being downloaded electronically via one or more networks, such as the Internet and an intermediate wireless network(s).

The mobile computing arrangement 500 may include hardware and software components coupled to the processing/control unit 502 for performing network data exchanges. The mobile computing arrangement 500 may include multiple network interfaces for maintaining any combination of wired or wireless data connections. For example, the illustrated mobile computing arrangement 500 may include wireless data transmission circuitry for performing network data exchanges.

This wireless circuitry includes a digital signal processor (DSP) 506 employed to perform a variety of functions, including analog-to-digital (AID) conversion, digital-to-analog (D/A) conversion, speech coding/decoding, encryption/decryption, error detection and correction, bit stream translation, filtering, etc. A transceiver 508, generally coupled to an antenna 510, transmits the outgoing radio signals 512 and receives the incoming radio signals 514 associated with the wireless device. These components may enable the arrangement 500 to join in one or more networks 515, including mobile service provider networks, local networks, and public networks such as the Internet.

The mobile computing arrangement 500 may also include an alternate network/data interface 516 coupled to the processing/control unit 502. The alternate network/data interface 516 may include the ability to communicate on secondary networks using any manner of data transmission medium, including wired and wireless mediums. Examples of alternate network/data interfaces 516 include USB, Bluetooth, Ethernet, 802.11 Wi-Fi, IRDA, etc. These alternate interfaces 516 may also be capable of communicating via the networks 515.

The processor 502 is also coupled to user-interface elements 518 associated with the mobile terminal. The user-interface 518 of the mobile terminal may include, for example, a display 520 such as a liquid crystal display and a camera 522. Other user-interface mechanisms may be included in the interface 518, such as keypads, speakers, microphones, voice commands, switches, touch pad/screen, graphical user interface using a pointing device, trackball, joystick, vibration generators, etc. These and other user-interface components are coupled to the processor 502 as is known in the art.

Other hardware such as sensors 524 may also be coupled to the processing unit 502. Sensors 524 may include location/orientation detectors 526 (e.g., GPS receivers, electronic compass), accelerometers 528, or any other sensor known in the art. These sensors 524 may be used in some types of game play. For example, accelerometers 528 may be used in conjunction with controllers inputs to modify some aspects of game play (e.g., "tilting" a pinball machine by moving the device 500). The sensors 524 may be integrated into the hardware packaging of the arrangement 500, or may be an add-on or peripheral device.

The program storage/memory 504 typically includes operating systems for carrying out functions and applications associated with functions on the mobile computing arrangement 500. The program storage 504 may include one or more of read-only memory (ROM), flash ROM, programmable and/or erasable ROM, random access memory (RAM), subscriber interface module (SIM), wireless interface module (WIM), smart card, hard drive, or other removable memory device. The storage/memory 504 of the mobile computing arrangement 500 may also include software modules for performing functions according to the disclosed embodiments.

The program storage/memory 504 may include a UPnP stack 530 that provides baseline UDA functionality. This stack 530 may be implemented as a common library or as a single standalone process. Alternatively, some or all UPnP applications on the system 500 may implement their own UPnP stacks. These UPnP applications may include a gaming server device 532, a gaming client device 534, a gaming control point 536, and UPnP-aware games 538. Other games 540 that are not natively UPnP-aware may also be capable of utilizing UPnP functions by way of a plug-in API 542. Generally, developers often include a plug-in API 542 as a way for third parties to extend the functionality of the base program 540. A plug-in can utilize this API 542 to include UPnP functions that allow the games 540 to be integrated with the functionality of the other UPnP gaming modules 532, 534, 536, 538.

Other applications 544 may also be UPnP enabled and capable of augmenting the gaming functionality. For example, UPnP audio-video (AV) components such as a media server and media renderer may be coordinated with the UPnP gaming devices to provide multimedia content associated with a game. For example, the gaming server 532 may offer a multiplayer action game that is coupled with a streaming audio service that provides personally selected music stored on the device 500 that may accompany game play. The establishment of the streaming audio service may take place using UPnP AV devices as known in the art in conjunction with establishing the gaming session via the UPnP gaming devices.

The gaming server and client 532, 534 may need to access persistent or non-persistent data storage for caching and or storing configuration and state data. An example of this storage requirement is shown as the connection database 546 and the games database 548. The connection database 546 is updated based on connections to the local gaming server 532 and connections to remote servers via the local gaming client 534. The games database 548 may include references to both local games 538, 540 and games that are detected remotely. The gaming server and client 532, 534 may also access remote gaming data, such as database 541 and server 543 accessible via external network 515.

Ideally, the software of the device 500 that utilizes the UPnP gaming functionality includes native UPnP interfaces, such as the stack 530. However, legacy programs (shown here as other applications 550) that provide functions associated with network play may still be quite popular, but certain restrictions (e.g., copyright concerns, no access to source code) may prevent adapting those games to utilize UPnP. It may still be possible to adapt such programs 550 to use the UPnP through a helper program or some other means. For example, some applications 550 may be able to receive commands and configurations via an interprocess communications (IPC) facility 552 of the operating system. These IPC mechanisms may include system messaging, sockets, pipes, middleware (e.g., CORBA, Java RMI), shared files, command line arguments, etc. Alternatively, a virtual environment, here represented by wrapper component 554, may set up a simulated environment in which to run the application 550. In this way, system or kernel calls can be intercepted, and events directed to hardware (e.g., network interfaces 516, 508) and/or operating-system APIs can be intercepted and translated to conform with UPnP protocols.

The other applications 550 may include games, but may also include other applications that can be used in conjunction with gaming. Programs such as browsers and media players may be run in conjunction with a game to enrich the experience. In some arrangements, a non-gaming specific application such as a browser can be adapted by the server 532 and/or client 534 to provide gaming capabilities. For example, a group trivia game where players compete to guess the correct answers in the shortest amount of time may be implemented using hypertext markup language (HTML) browser content (e.g., text, selection boxes, buttons) and therefore may not need a dedicated application. The gaming client 534 (or other UPnP gaming device) may be arranged to format the data correctly and send it as HTML to a browser. In response to user selection via the browser, the client 534 can send the resulting data to the server 532 that is hosting the game.

Figure 5:
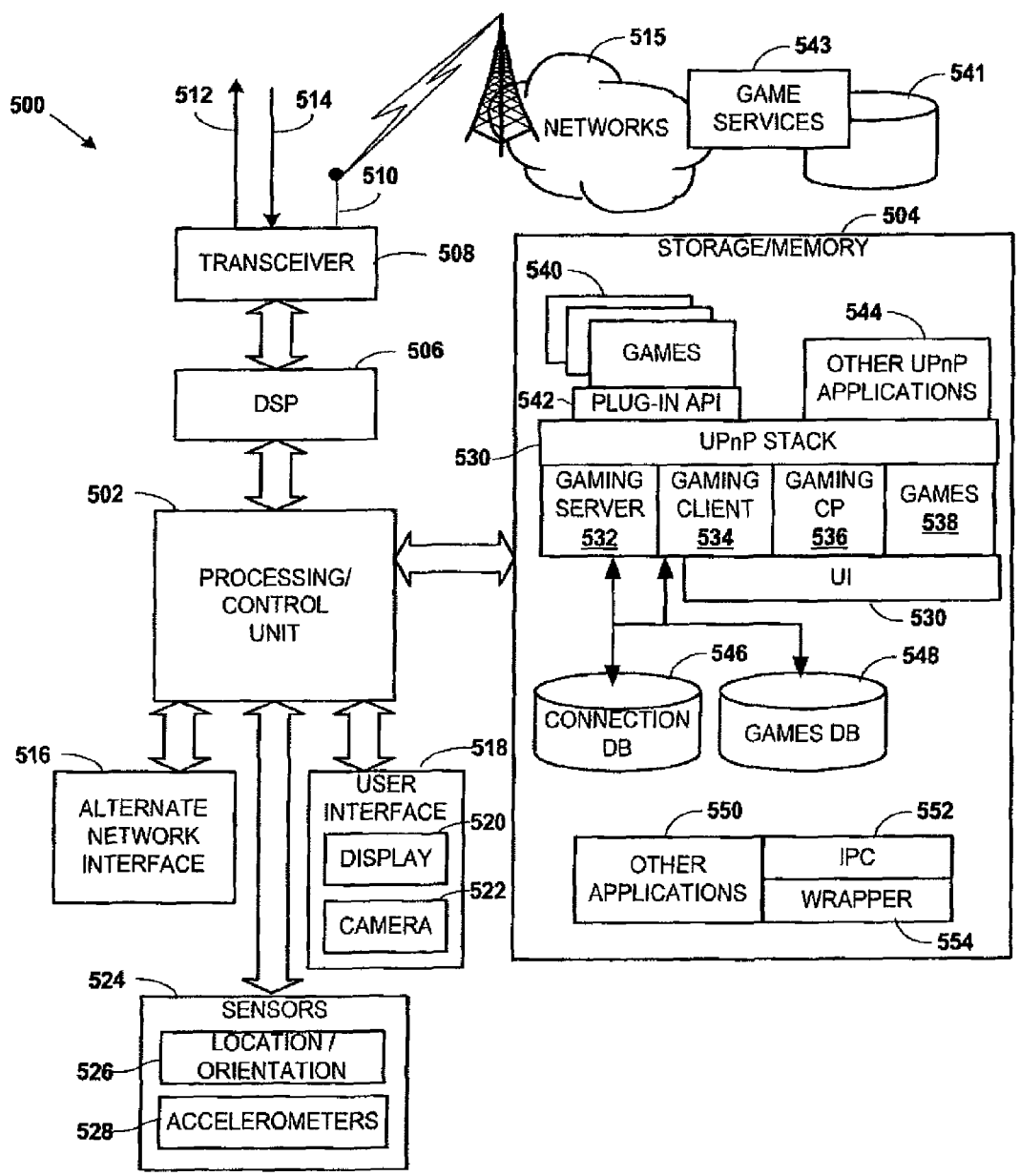
FIG. 5 is a block diagram of a mobile device according to the disclosed embodiments.

The mobile computing arrangement 500 of FIG. 5 is provided as a representative example of a computing environment in which the principles of the presently disclosed embodiments may be applied. From the description provided herein, those skilled in the art will appreciate that the disclosed embodiments are equally applicable in a variety of other currently known and future mobile and landline computing environments. For example, desktop computing devices similarly include a processor, memory, a user interface, and data communication circuitry. Thus, the disclosed embodiments are applicable in any known computing structure where data may be communicated via a network.

Figure 6:
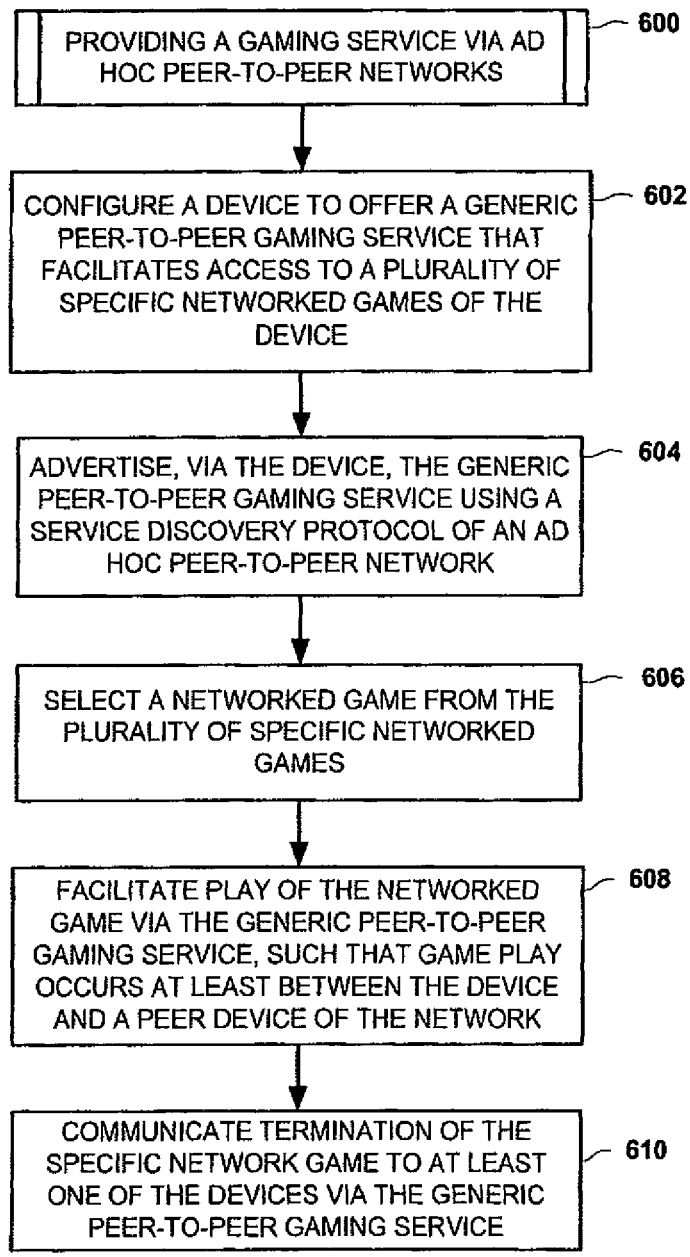
FIG. 6 is a flowchart illustrating a method for providing a gaming service via ad hoc, peer-to-peer networks according to the disclosed embodiments.

In reference now to FIG. 6, a flowchart illustrates a procedure 600 for providing a gaming service via ad hoc peer-to-peer networks. A device is configured 602 to offer a generic peer-to-peer gaming service that facilitates access to a plurality of specific networked games of the device. The device advertises 604 the generic peer-to-peer gaming service using a service discovery protocol of an ad hoc peer-to-peer network. A networked game is selected 606 from the plurality of specific networked games, and the selection typically is made via a peer device of the network. Play of a networked game via the generic peer-to-peer gaming service is facilitated 608. Play of the networked game occurs at least between the device and a peer device of the network, and may use out-of-band protocols, or control protocols of the peer-to-peer network. Termination of the specific network game is communicated 610 to at least one of the devices via the generic peer-to-peer gaming service.

Figure 7:
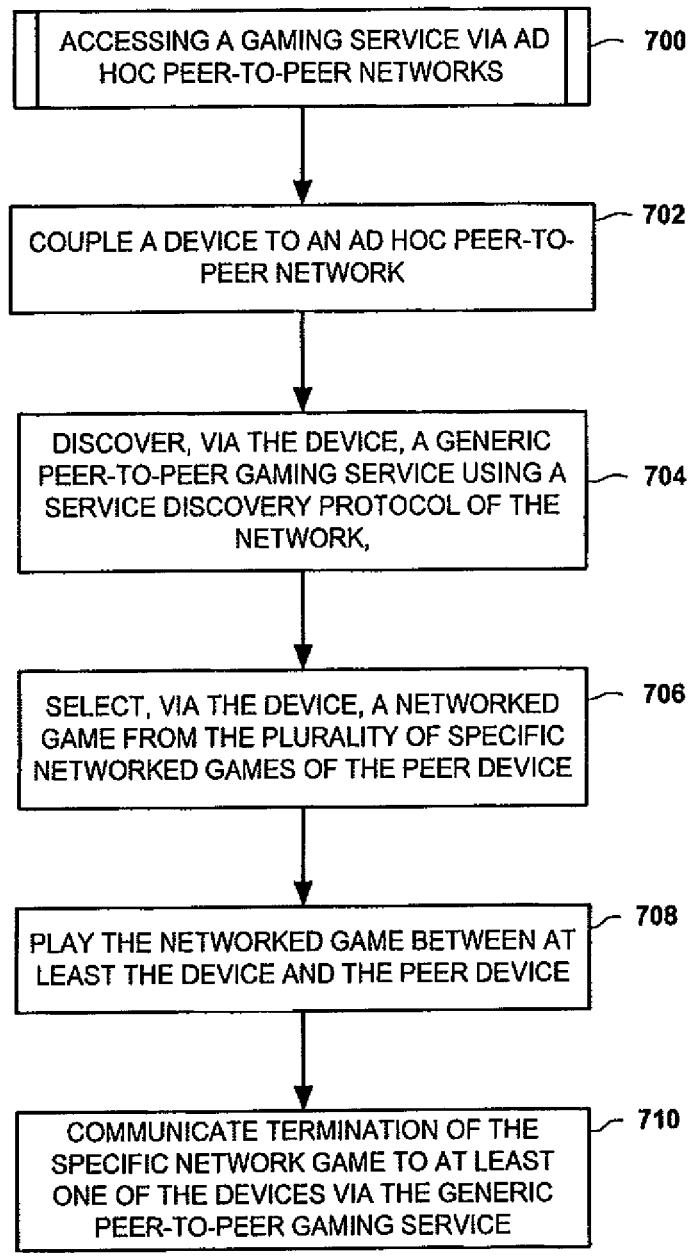
FIG. 7 is a flowchart illustrating a method for using a gaming service via ad hoc, peer-to-peer networks according to the disclosed embodiments.

In reference now to FIG. 7, a flowchart illustrates a procedure 700 for accessing a gaming service via ad hoc peer-to-peer networks. A device is coupled 702 to an ad hoc peer-to-peer network. The device discovers 704 a generic peer-to-peer gaming service using a service discovery protocol of the ad hoc peer-to-peer network. The generic peer-to-peer gaming service is offered by a peer device and facilitates access to a plurality of specific networked games of the peer device. The device selects 706 a networked game from the plurality of specific networked games of the peer device. The networked game is played 708 between at least the device and the peer device. Play of the networked game occurs at least between the device and a peer device of the network, and may use out-of-band protocols, or control protocols of the peer-to-peer network. Termination of the specific network game is communicated 710 to at least one of the devices via the generic peer-to-peer gaming service.

It will be appreciated that various alternates to the illustrated ad hoc, peer-to-peer gaming services may be implemented. In one arrangement UPnP (or other ad hoc service discovery protocol) is used only for device discovery, such as to find other UPnP-enabled gaming devices. Everything else would happen "out-of-band" from the UPnP protocol. In another arrangement, UPnP can be used for device discovery and service discovery, such as to find both the UPnP enabled devices and networked games available on those devices. Everything else would happen "out-of-band" from the UPnP point of view. In yet another arrangement, UPnP can be used for device & service discovery and for gaming control during the game. Although UPnP may not be well-suited for fast "action" games, many games (e.g., chess, cards, trivia) are relatively insensitive to low bandwidth and high latency often associated with mobile networks. In such a case, the game play portion could be implemented with similar to (but not necessarily identical to) the ProcessInput mechanism used in the UPnP Remote UI DCP, or other similar remote network control protocol.

The foregoing description of the exemplary embodiments has been presented for the purposes of illustration and description. It is not intended to be exhaustive or to limit the disclosed embodiments to the precise form disclosed. Many modifications and variations are possible in light of the above teaching. It is intended that the scope of the disclosed embodiments be limited not with this detailed description, but rather determined by the claims appended hereto.

What is claimed is:

1. A method comprising:
advertising, via a device, a peer-to-peer gaming service using a peer-to-peer network that facilitates a user of a peer device in selecting from a plurality of specific networked games of the device for purposes of accessing and playing the games, wherein the specific networked games are not already installed on the peer device;
facilitating, via the device, download of a program to the peer device in response to a selection of a networked game from a plurality of specific networked games not already installed on the peer device, wherein the program is configured to execute the selected network game on a processor of the peer device, wherein said facilitating download of the program to the peer device comprises directing, via the device, the peer device to a third party computing arrangement where the peer device can download the program and wherein said facilitating download of the program to the peer device further comprises providing, via the device, authentication to the peer device for access to the third party computing arrangement, wherein the authentication limits the downloaded program for play of the selected networked game with only the device; and
facilitating, by the device, play of the selected networked game via the peer-to-peer gaming service, wherein play of the selected networked game occurs at least between the device and the peer device of the network.

2. The method of claim 1, further comprising exchanging, via the device, game play data of the selected networked game via an out-of-band network mechanism, said game play data comprising XML messages.

3. The method of claim 1, further comprising exchanging, via the device, game play data of the selected networked game via control protocols of the peer-to-peer network.

4. The method of claim 1, wherein the advertising, via the device, of the peer-to-peer gaming service advertises the existence of the device and willingness of a user of the device to engage in gaming activity using a networked game as selected by the user of the peer device from the plurality of specific networked games.

5. The method of claim 1, wherein the device facilitating play of the networked game comprises:
receiving, via the device via the peer-to-peer network, a request for compatible games from the peer device, wherein the request includes one or more games supported on the peer device; and returning, via the device, a set of specific networked games that are supported on both the device and the peer device.

6. The method of claim 1, wherein the, peer-to-peer network comprises a Universal Plug and Play network.

7. The method of claim 1, wherein the device and the peer device both comprise personal mobile devices.

8. The method of claim 7, wherein the personal mobile devices are connectable to wireless provider networks and to local networks via secondary wireless interfaces allowing the device and the personal mobile devices to access and play the networked game.

9. A method, comprising:
discovering, via a device, a peer-to-peer gaming service of a peer-to-peer network offered by a peer device, wherein the peer-to-peer gaming service facilitates a user of the device to select, access, and play a plurality of specific networked games of the peer device, wherein the specific networked games are not already installed on the device;
selecting, via the device, a networked game from the plurality of specific networked games of the peer device; and
downloading a program by the device, wherein the program is configured to execute the selected networked game on a processor of the device, wherein downloading the program comprises downloading the program from a third party computing arrangement and receiving from the peer device, authentication for access to the third party computing arrangement, wherein the authentication limits the downloaded program for play of the networked game with only the peer device.

10. The method of claim 9, further comprising exchanging, via the device, game play data of the networked game via an out-of-band network mechanism, said game play data comprising XML messages.

11. The method of claim 9, further comprising exchanging, via the device, game play data of the networked game via control protocols of the peer-to-peer network.

12. The method of claim 9, further comprising:
requesting, by the device, via the peer-to-peer network, a list of compatible games from the peer device, wherein the request includes one or more games supported on the device; and
receiving, by the device, a set of specific networked games that are supported on both the device and the peer device.

13. The method of claim 9, wherein discovering, via the device includes receiving, by the device, advertising of the peer-to-peer gaming service from the peer device including the existence of the peer device and willingness of a user of the peer device to engage in gaming activity using any of the plurality of specific networked games.

14. The method of claim 9, wherein the peer-to-peer network comprises a Universal Plug and Play network.

15. The method of claim 9, wherein the device and the peer device both comprise personal mobile devices.

16. The method of claim 15, wherein the personal mobile devices are connectable to wireless provider networks and to local networks via secondary wireless interfaces allowing the device and the personal mobile devices to access and play the networked game.

17. An apparatus, comprising:
at least one processor and at least one memory including computer instructions, the at least one memory and the computer instructions configured to, with the at least one processor, cause the apparatus at least to:
discover a peer-to-peer gaming service offered by a peer device, wherein the peer-to-peer gaming service facilitates selecting, accessing, and playing a plurality of specific networked games of the peer device over a peer-to-peer network, wherein the specific networked games are not already installed on the apparatus;
select a networked game from the plurality of specific networked games of the peer device; and
download a program in response to selecting the networked game, wherein the program is configured to execute the selected networked game on the at least one processor of the apparatus, wherein downloading the program comprises downloading from a third party computing arrangement as directed by the peer device and receiving, via the peer device, authentication for access to the third party computing arrangement, wherein the authentication limits the downloaded program for play of the networked game with only the peer device.

18. The apparatus of claim 17, wherein the at least one memory and the computer instructions are configured to, with the at least one processor, cause the apparatus at least to exchange gaming event data with the peer device utilizing an out-of-band network mechanism, said game play data comprising XML messages.

19. The apparatus of claim 17, wherein the at least one memory and the computer instructions are configured to, with the at least one processor, cause the apparatus at least to exchange gaming event data with the peer device utilizing control protocols of the peer-to-peer network.

20. The apparatus of claim 17, wherein the at least on memory and the computer instructions are further configured to, with the at least one processor, cause the apparatus to:
receive a list of the specific networked games of the peer device;
facilitate user selection of the selected networked game via a user input interface of the apparatus; and
facilitate play of the selected networked game in response to the user selection.

21. The apparatus of claim 17, wherein the at least one memory and the computer instructions are configured to, with the at least one processor, cause the apparatus to receive advertising of the peer-to-peer gaming service from the peer device including the existence of the peer device and willingness of a user of the peer device to engage in gaming activity using any of the plurality of specific networked games.

22. The apparatus of claim 17, wherein the at least one memory and the computer instructions are further configured to, with the at least one processor, cause the apparatus to:
offer a locally provided peer-to-peer gaming service that facilitates access to a local plurality of specific networked games;
advertise the locally provided peer-to-peer gaming service; and
facilitate play of a second networked game via the locally provided peer-to-peer gaming service, wherein the second networked game is selected from the plurality of local specific networked games by a second peer device of the network, and wherein play of the second networked game occurs at least between the apparatus and the second peer device.

23. The apparatus of claim 22, wherein the at least one memory and the computer instructions are configured to, with the at least one processor, cause the apparatus at least to exchange gaming event data between the apparatus and the second peer device utilizing an out-of-band network mechanism.

24. The apparatus of claim 22, wherein the at least one memory and the computer instructions are configured to, with the at least one processor, cause the apparatus at least to exchange gaming event data between the apparatus and the second peer device utilizing control protocols of the peer-to-peer network.

25. The apparatus of claim 22, wherein the wherein the at least one memory and the computer instructions are further configured to, with the at least one processor, cause the apparatus to perform downloading of a program to the second peer device in response to selecting the networked game by the second peer device, wherein the program facilitates play of the second networked game on the second peer device.

26. The apparatus of claim 25, wherein the memory comprises the program, and wherein the apparatus is configured to upload the program to the second peer device.

27. The apparatus of claim 17, wherein the peer-to-peer network comprises a Universal Plug and Play network.

28. A tangible computer-readable medium having instructions stored thereon which are executable by an apparatus for:
discovering a peer-to-peer gaming service offered by a peer device, wherein the peer-to-peer gaming service facilitates selecting, accessing, and playing a plurality of specific networked games of the peer device over a peer-to-peer network, wherein the specific networked games are not already installed on the apparatus;
selecting a networked game from the plurality of specific networked games of the peer device; and
downloading a program in response to the selecting of the networked game, wherein the program is configured to execute the networked game on a processor of the apparatus, wherein downloading the program comprises downloading from a third party computing arrangement as directed by the peer device and receiving, via the peer device, authentication for access to the third party computing arrangement, wherein the authentication limits the downloaded program for play of the networked game with only the peer device.

29. The tangible computer readable medium of claim 28, wherein the instructions are further executable by the apparatus for:
offering a locally provided peer-to-peer gaming service that facilitates access to a local plurality of specific networked games;
advertising the locally provided peer-to-peer gaming service; and
facilitating play of a second networked game via the locally provided peer-to-peer gaming service, wherein the second networked game is selected from the plurality of local specific networked games by a second peer device of the network, and wherein play of the second networked game occurs at least between the apparatus and the second peer device.

30. The tangible computer-readable medium of claim 28, wherein the discovery includes receiving advertising of the peer-to-peer gaming service from the peer device including the existence of the peer device and willingness of a user of the peer device to engage in gaming activity using any of the plurality of specific networked games.

31. The tangible computer-readable medium of claim 28, wherein the peer-to-peer network comprises a Universal Plug and Play network.

32. A system comprising:
means for offering, via a first peer device, a peer-to-peer gaming service via a peer-to-peer network, wherein the peer-to-peer gaming service facilitates a user of a second peer device in selecting accessing, and playing a plurality of specific networked games, wherein the specific networked games are not already installed on the second peer device;
means for discovering, via the second peer device of the network, the peer-to-peer gaming service;
means for facilitating a download of a program to the second peer device in response to the selection of the specific networked game, wherein the program is configured to execute the game on a processor of the second peer device, wherein facilitating the download of the program to the second peer device comprises directing, via the first peer device, the second peer device to a third party computing arrangement where the second peer device can download the program and comprises providing, via the first peer device, authentication to the second peer device for access to the third party computing arrangement, wherein the authentication limits the downloaded program for play of the networked game with only the first peer device; and
means for facilitating commencement of the selected specific networked game between the first and second peer via the generic peer-to-peer gaming service.

33. The system of claim 32, wherein the peer-to-peer network comprises a Universal Plug and Play network.

\* \* \* \* \*